Figure 1:
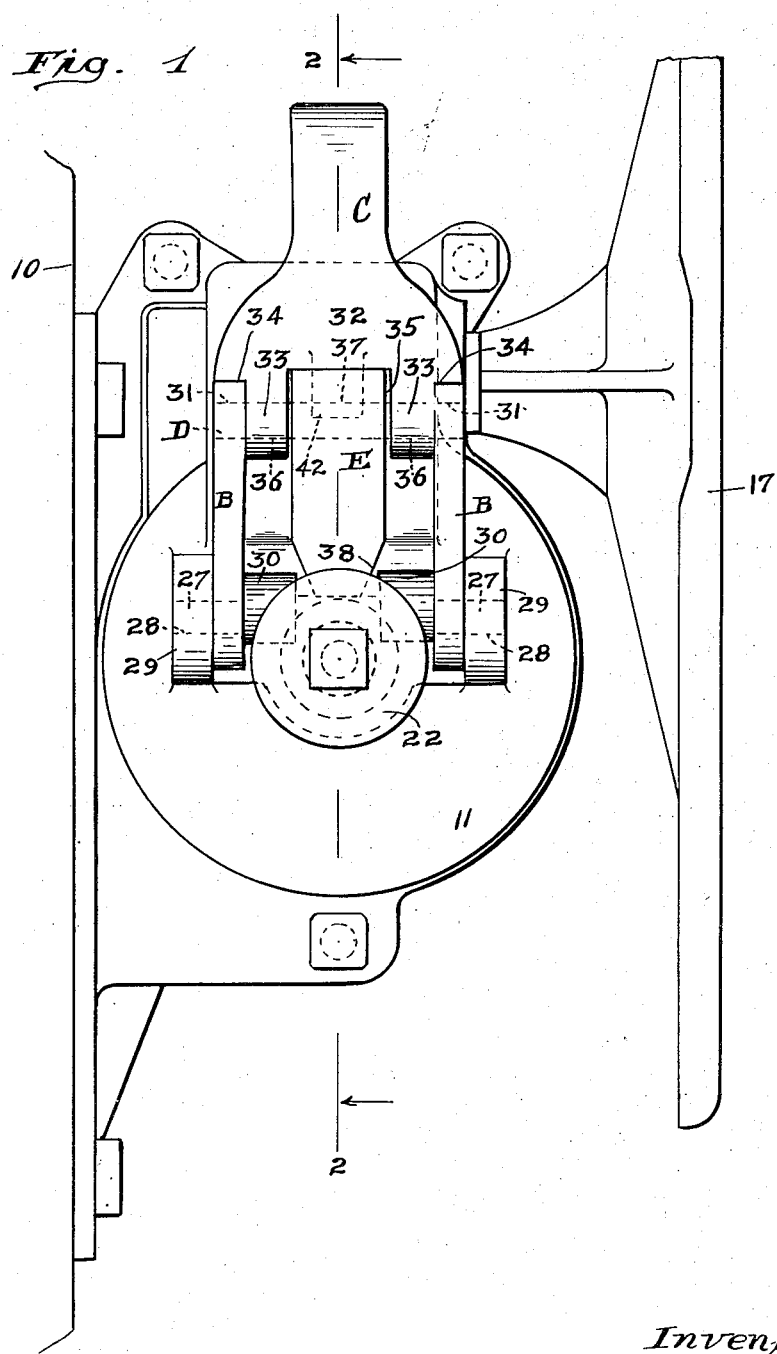

May 29, 1951  G. E. DATH  2,554,563
LEVER MECHANISM
Filed July 25, 1949  3 Sheets-Sheet 1

Inventor:
George E. Dath.
By Henry Fuchs.
Atty.

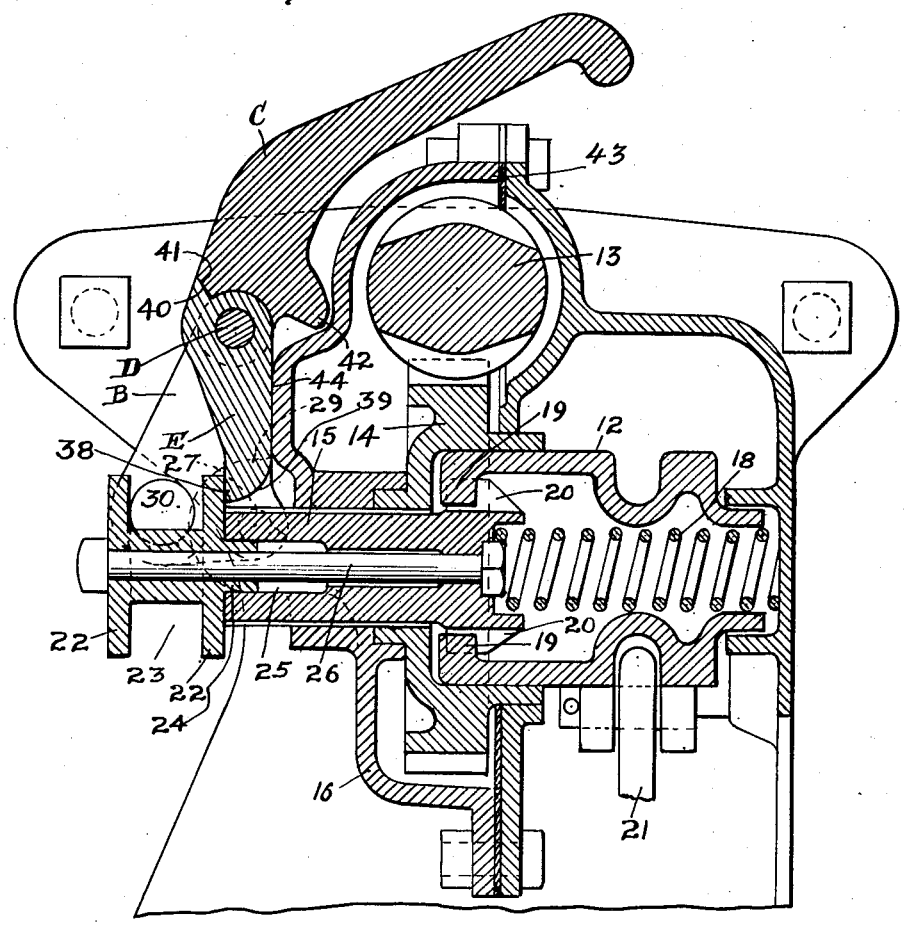

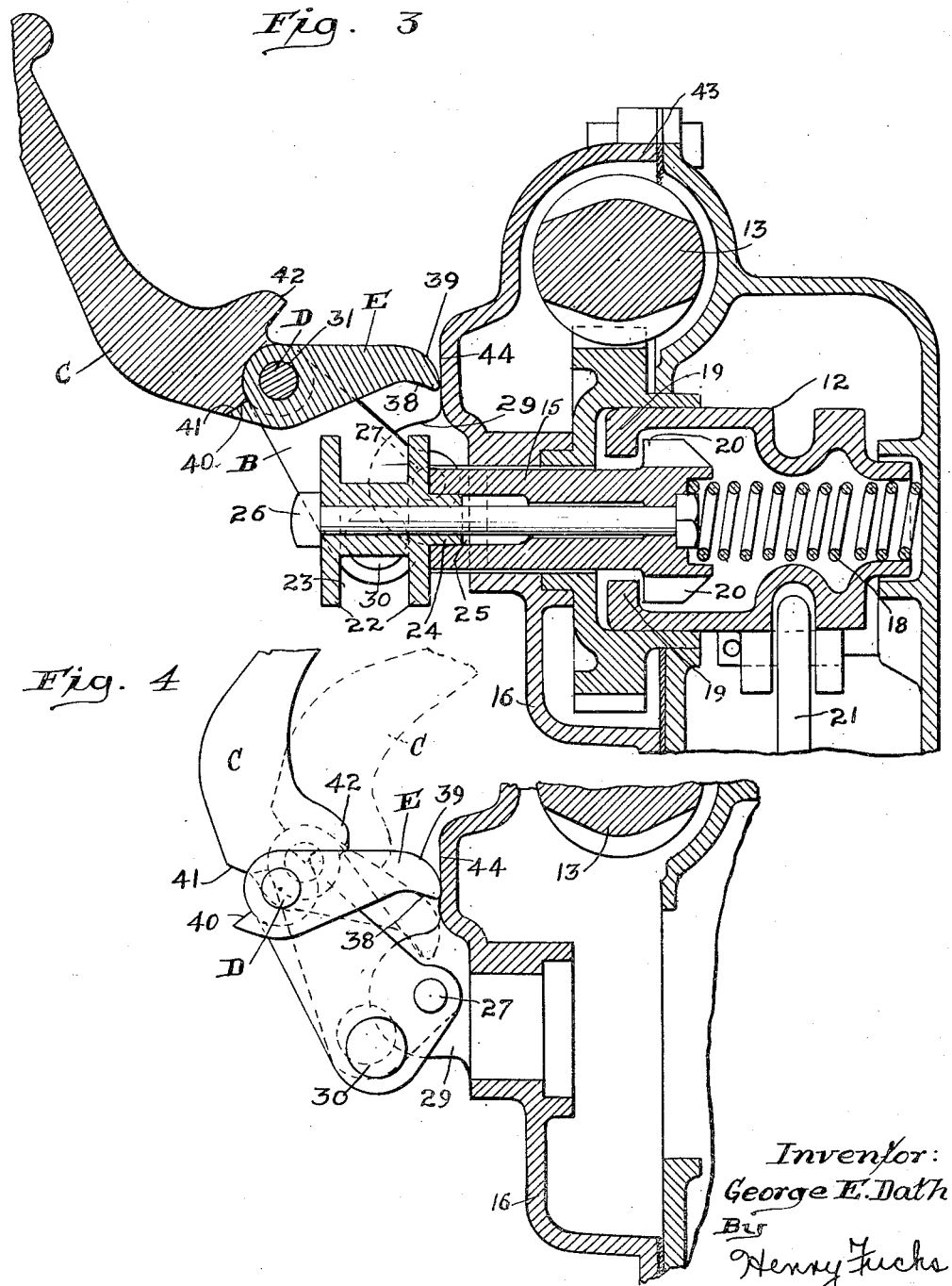

Patented May 29, 1951

2,554,563

UNITED STATES PATENT OFFICE 2,554,563

LEVER MECHANISM

George E. Dath, Mokena, Ill., assignor to W. H. Miner, Inc., Chicago, Ill., a corporation of Delaware Application July 25, 1949, Serial No. 106,517

3 Claims. (Cl. 74—101)

This invention relates to improvements in clutch shifting mechanism for hand brakes, and more particularly for hand brakes of the worm gear operated type, comprising chain winding means and a hand wheel operated actuating mechanism, wherein the actuating mechanism is operatively connected to the winding means for the brake chain by releasable clutch means to provide for quick release of the brakes without spinning of the hand wheel.

One object of the invention is to provide in a worm operated brake mechanism of the character specified, enclosed within a housing, means including a lever for actuating the clutch mechanism to release the clutch means from operative driving engagement with the worm gear mechanism and further effective to reengage the clutch means through movement of the lever under the influence of gravity.

A more specific object of the invention is to provide a lever mechanism especially adapted for actuating shiftable clutch means, rotatable with the worm gear actuated means of a hand brake mechanism for operatively connecting the winding means to the actuating mechanism, comprising a swinging lever element having an eccentric connection with the shiftable clutch means, an operating handle lever arm pivotally connected to an upstanding arm on said swinging element, and a pivoted finger swingable on the axis of pivotal connection between said element and lever arm, wherein the lever arm, when swung in one direction, has shouldered engagement with the finger to swing the same into engagement with the clutch means and shift the latter into operative driving engagement with the winding means, and when swung in a reverse direction has shouldered engagement with the finger to swing the same in a reverse direction into camming engagement with a fixed support to forcibly swing the lever element in a direction to disengage the clutch means from operative clutching engagement with the winding means.

Other objects of the invention will more clearly appear from the description and claims hereinafter following.

In the accompanying drawings forming a part of this specification, Figure 1 is a side elevational view of a geared hand brake mechanism embodying my improvements, said view illustrating the same mounted on the end wall of a railway car. Figure 2 is a vertical sectional view, corresponding substantially to the line 2—2 of Figure 1. Figure 3 is a view similar to Figure 2, partly broken away, illustrating the parts in different positions. Figure 4 is a broken view of the mechanism shown at the upper left hand side of Figure 2, illustrating the actuating lever means in elevation, but in a different position from that shown in either Figure 2 or Figure 3, and indicating in dotted lines still another position of the actuating lever means.

In said drawings, 10 indicates the vertical end wall of a railway car on which is mounted the hand operated worm gear actuated brake mechanism 11. The brake mechanism illustrated is similar to that disclosed in Patent No. 1,974,581, granted to Roland J. Olander, September 25, 1934, and operates in a like manner. The brake mechanism 11 includes a chain winding drum 12, a worm 13, a worm wheel 14, a sliding clutch element 15, and means for shifting the clutch element. The parts of the mechanism are all enclosed in a housing 16 and the worm 13 is manually rotated by a hand wheel 17, exterior to the housing. The worm 13 meshes with the worm wheel 14 and imparts rotary movement to the latter. The clutch element 15 serves to operatively connect the winding drum 12 to the worm wheel 14, and rotary movement of the drum is thus effected when the hand wheel is rotated in brake tightening direction. The clutch element 15 is held operatively engaged with the clutch means of the drum 12 by a spring 18 contained within the hollow portion of said drum. The clutch means on the drum comprises an annular series of interior projections or teeth 19, which cooperate with similar projections or teeth 20 on the clutch element 15. The clutch element 15 is splined to the worm wheel 14 to rotate in unison therewith. The brake chain, which leads to the brake mechanism proper of the car, is indicated by 21, and is fixed to the drum to be wound on the latter in the usual manner. The clutch element 15, which is slidingly mounted in the hub of the worm wheel 14, extends outwardly of said worm wheel and the housing, as shown most clearly in Figures 2 and 3, and said extension is provided with a spoollike section 22 at the outer end thereof, having an annular groove 23 to cooperate with the means for shifting the clutch element. The spool section has a reduced, cylindrical projection 24 at its inner end, seated in an axial opening 25 in the element 15. The spool section 22 is secured to the clutch element by a bolt 26 extending axially through said section and element.

In carrying out my invention, I provide a clutch shifting means comprising broadly a pair of laterally spaced, pivoted link members B—B, an actuating lever arm C, a pivot pin D connecting the members B—B and the lever arm C, and a finger E swingingly supported on the pivot pin D.

The link members B—B of the clutch shifting means are swingingly mounted on the housing by laterally outstanding projecting trunnions 27—27 on the outer sides of said link members, rotatably supported in transversely aligned bearing openings or seats 28—28 provided in laterally spaced, outwardly projecting lugs 29—29 on the housing 16 at opposite sides of the spool section 22 of the sliding clutch element 15. The members B—B form arms of a fork extending from the lever arm C. Each member B is in the form of a flat plate tapering toward its upper end. The trunnions 27—27 are formed, respectively, on the members B—B at the lower ends thereof, each trunnion projecting outwardly from the corresponding member B and being located at the right hand portion of the lower end thereof, as seen in Figure 2. Each member B is further provided with an inwardly projecting trunnion 30 at the lower end thereof and located at the left hand portion of said lower end, as seen in Figure 2. The trunnions 30—30 of the two members B—B are in transverse alignment and are engaged within the groove 23 of the spool 22 of the clutch element 15. The upper ends of the members B—B are provided with transversely aligned, pivot pin receiving openings 31—31.

The lever arm C is shaped as shown in Figures 1 and 2. The bottom end of the lever arm C is flared laterally, as illustrated in Figure 1, said flared portion forming a head 32. The head 32 is provided with depending, laterally spaced lugs 33—33, which are inset from the side edges of the head, as shown in Figure 1, thereby providing laterally opening seats 34 at opposite sides of the head into which the upper ends of the members B—B extend. The laterally spaced lugs 33—33 further provide a recess 35 therebetween, into which the upper end of the finger E extends. In other words, the finger E is disposed between the lugs 33—33 and the members B—B embrace these lugs at opposite sides. The lugs 33—33 and the finger E have pivot pin receiving openings 36 and 37. The platelike members B—B and the finger E are pivotally connected to the handle lever C by the pin D, which extends through the openings 36—36 of the lugs 33—33, the openings 31—31 of the plate members B—B, and the opening 37 of the finger E.

The finger E has a pointed tooth-shaped outer end, as indicated at 38. The back of the finger E, at said tooth-shaped end, is preferably rounded off, as indicated at 39, to provide camming action, as hereinafter described. At the pivoted end thereof, the finger E is provided with a substantially radial stop lug 40 engageable by a stop face 41 on the left hand side of the lower end portion of the lever arm C, as seen in Figure 2, to cause the finger to swing with the arm C when the latter is pulled toward the left, as viewed in Figure 2. At the side thereof opposite to the stop face 41, the lower end of the lever arm C is provided with a projecting lug 42, adapted to engage the rear side of the finger E to swing the latter downwardly, as seen in Figure 4, when the lever arm C is pulled toward the right.

In Figure 2 of the drawings, the clutch element 15 is shown in driving engagement with the drum 12, and rotation imparted to the worm 13, by turning of the hand wheel in direction to apply the brakes, is transmitted to the drum through the worm wheel 14 to effect winding of the chain 21 on the drum. At this time the operating handle lever C is in the extreme right hand position shown in Figure 2, that is, in position overhanging the portion 43 of the housing which contains the worm 13, with the stop lug 40 of the finger E engaged by the stop 41 of said lever arm and the finger resting flat against the vertical wall member 44 of the portion 43 of the housing, and the toothed end of said finger engaged in back of the spool section 22 of the clutch element 15.

The operation of my improved clutch shifting means is as follows: To release or disengage the drum from operative relation with the worm wheel, the operating lever C is swung to the left, as viewed in Figure 2, and through shouldered engagement with the finger E rotates the latter in contra-clockwise direction on the pivot pin D, as viewed in Figure 2, swinging the finger against the wall 44 of the housing 16, thereby camming the upper ends of the link members B—B to the left, as shown in Figure 3, and forcing the clutch element 15 toward the right, disengaging the tooth thereof from the teeth of the drum 12 to permit free rotation of the drum to release the brakes. To effect reengagement of the clutch element 15 with the drum 12, the lever arm C is swung to the right from the position shown in Figure 3 to the full line position shown in Figure 4 with the lug 42 of said lever supported on the finger E. In this position, the lever arm C has been swung beyond the vertical, and thus its weight exerts pressure on the finger E to rotate the same in clockwise direction, as viewed in Figure 4, to engage the spool section of the clutch element 15, and together with the spring 18, move the clutch element to the engaged position shown in Figure 1. In the event that rotation of the drum in release of the brakes has been stopped, with the spaces between the teeth of the drum not registered with the teeth of the clutch element, a slight turn of the hand wheel, in initiating the operation of tightening the brakes, will rotate the clutch element to the proper extent to permit the teeth of the same to engage between the teeth of the drum, whereby the clutch element is free to be projected to the left by the spring 18 and by the action of the lever arm C, the weight of which rotates the finger E in clockwise direction from the full line position shown in Figure 4, through the dotted line position shown in said figure, to the position shown in Figure 2.

I claim:

1. In a shifting means for a sliding element the combination with a pivoted member having an eccentric connection with said element; of a lever pivotally connected to said member; and a finger rotatable about the pivotal connection between said lever and member, said finger having camming engagement with a fixed support, said lever and finger having shouldered engagement with each other to effect movement of said finger and lever in unison in one direction, and shouldered engagement with each other to effect movement of said finger and lever in unison in a reverse direction.

2. In a shifting means for a sliding element having a spool portion, the combination with a link member pivoted at one end on a fixed support, said link member having a trunnion thereon eccentric to the pivot of said member engageable with said spool portion of said element to move said element in one direction; of a pivot pin extending through the other end of said link member; a finger pivoted on said pin and having camming engagement with a fixed cam surface portion; a lever pivoted on said pin, said lever having a lug at the pivoted end thereof engageable with said finger when said lever is swung in one direction for swinging the finger in one direction to engage the same with said spool portion and move the latter in a reverse direction; and cooperating shoulders on said lever and link member engageable with each other when said lever is swung in a reverse direction, for swinging said finger against said cam surface to actuate the link member and move said element in said first named direction.

3. In a shifting means for a spring pressed sliding element said element having a spool portion thereon, the combination with a shifting lever comprising a handle lever section and a supporting section; of a pivot swingingly connecting the inner end of said handle lever section to the outer end of said supporting section, said supporting section being swingingly supported on a fixed support and having an eccentric trunnion engaged with said spool section; a cam finger swingingly supported on said pivot; a fixed cam surface with which said cam finger cooperates; a shoulder on said handle lever engageable with said finger when said lever is swung in one direction to swing said finger into engagement with and actuate said spool portion to move said element in one direction against the resistance of said spring; and a lug on said handle lever engageable with said finger when the lever is swung in a reverse direction to swing said finger toward and along said cam surface to swing said supporting section of the lever in a reverse direction to move said element in reverse direction.

GEORGE E. DATH.

REFERENCES CITED

The following references are of record in the file of this patent:

UNITED STATES PATENTS

| Number | Name | Date |
|---|---|---|
| 951,845 | Rundle et al. | Mar. 15, 1910 |
| 1,882,839 | Haseltine | Oct. 18, 1932 |
| 2,281,143 | Dickerson | Apr. 28, 1942 |
| 2,293,504 | Higgins | Aug. 18, 1942 |
| 2,439,941 | Lounsbury | Apr. 20, 1948 |